T. J. MURRAY.
SPECTACLES.
APPLICATION FILED AUG. 21, 1913.

1,145,786.

Patented July 6, 1915.

Witnesses
C. R. Bealle.
H. Ways Martin

Inventor
T. J. Murray.
By
Attorney

UNITED STATES PATENT OFFICE.

TIMOTHY J. MURRAY, OF WHITE PLAINS, NEW YORK.

SPECTACLES.

1,145,786. Specification of Letters Patent. Patented July 6, 1915.

Application filed August 21, 1913. Serial No. 786,022.

*To all whom it may concern:*

Be it known that I, TIMOTHY J. MURRAY, a citizen of the United States, residing at White Plains, in the county of Westchester and State of New York, have invented certain new and useful Improvements in Spectacles; and I do hereby declare the following to be a full, clear, and exact description of the invention, such as will enable others skilled in the art to which it appertains to make and use the same.

This invention relates to new and useful improvements in spectacles and has for its object the provision of a device of the above character which may be easily and quickly applied to the wearer without causing any unnecessary inconvenience.

Another object of my invention is the provision of such a device which will eliminate the ordinary use of spring means to secure the same to the wearer's nose and thereby prevent any irritation of the bone of the nose.

Still another object of my invention is the provision of such a device which will combine the advantages of the nose glasses as well as those of the ordinary type of spectacles, and eliminate the disadvantages of the two types.

Figure 1:
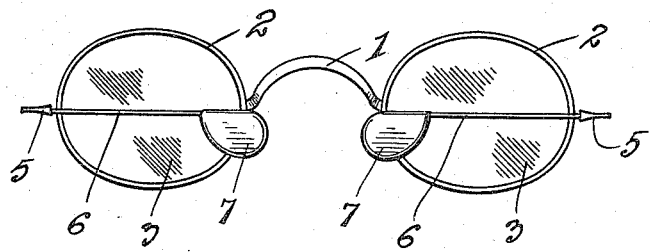
Figure 2:
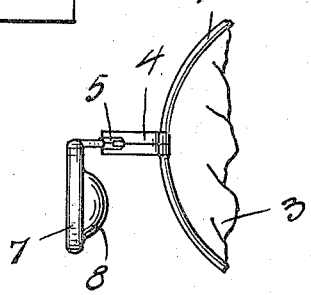
Figure 4:
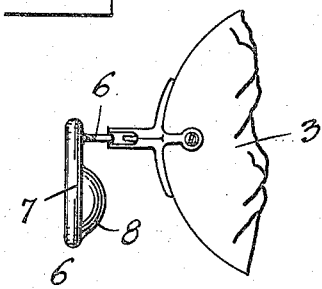
Figure 3:
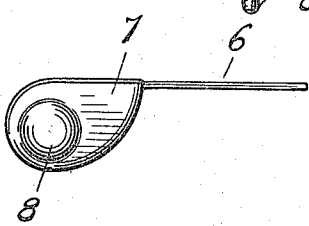
Figure 5:
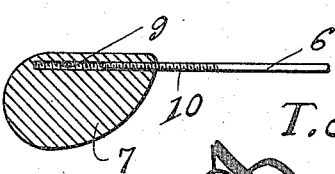

With the above and other objects in view I now proceed to describe my invention in the following specification and accompanying drawings, in which, Figure 1 is a rear view of my improved spectacles showing the same in their folded position, Fig. 2 is an enlarged detail view of the temple engaging pad showing the same secured to the frame of the spectacles, and Fig. 3 is a side view of the temple engaging pad, Fig. 4 is an enlarged detail view of my improved temple engaging pad as it would appear when applied on rimless spectacles, and Fig. 5 is an enlarged detail sectional view of a modification of the temple engaging pad.

Referring to the drawings by characters of reference 1 indicates the bridge piece of my improved spectacle which is adapted to rest upon the bridge of the nose when the same is in place. At each extremity of the bridge piece and firmly secured thereto are the usual frames 2 which are adapted to receive the lenses 3. These frames are preferably provided with the outstanding portions 4 at points diametrically opposite the point where the bridge piece joins the frames.

To the outstanding portions 4 I pivotally secure the sleeves 5 which are adapted to receive the ends of the temple bars 6 as is clearly illustrated in Fig. 1. These temple bars 6 preferably terminate in the enlarged portions 7 as will be clearly seen upon referring to the drawings and are shortened as shown so that when the spectacles are in place the temple engaging pads rest against the face at a point directly beneath the temple. These temple engaging pads 7 are preferably provided with the semi-spherical portions 8 which are formed integrally therewith. These semi-spherical portions 8 are preferably formed of the same material from which the enlarged portions 7 are made and define a circular convex enlargement or knob, being smoothed off to prevent any irritation of the flesh against which they press.

In the modified form illustrated in Fig. 5 the temple engaging pad 7 is preferably provided with an internally screw threaded bore 9 which is adapted to coöperate with the screw threaded end 10 of the temple bar 6. Thus, it will be seen that adjustment of the pad 7 may be obtained and will eliminate the necessity of a person being fitted each time a pair of spectacles is purchased.

It will be clearly seen from the foregoing that owing to the particular construction of my improved spectacles there will be no irritation of the nose and any soreness from the contact of the usual springs used in connection with spectacles of this character upon the ears will be eliminated.

While in the foregoing I have shown and described the preferred embodiment of my invention I wish it to be understood that I may change the specific arrangement and combination of parts, without in any way departing from the spirit and scope of my invention as defined in the appended claim.

What I claim is:—

In combination, a temple bar having its free end screw threaded, a relatively broad flat pad having a screw threaded bore adjacent its upper edge, said bore adjustably receiving the threaded end of the temple bar, the greater portion of the pad being disposed below the temple bar to hold the pad against accidental adjustment upon the temple bar, and a substantially semi-spherical portion formed on the inner face of the pad at a point below the temple bar to engage the cheek bone of the user.

In testimony whereof I affix my signature in presence of two witnesses.

TIMOTHY J. MURRAY.

Witnesses:
GEORGE T. SMYTH,
JOHN J. DOYLE.